United States Patent [19]

Kubo

[11] Patent Number: 5,552,470
[45] Date of Patent: Sep. 3, 1996

[54] THERMOPLASTIC ELASTOMER COMPOSITION

[75] Inventor: Junichi Kubo, Yokohama, Japan

[73] Assignee: Nippon Oil Co., Ltd., Tokyo, Japan

[21] Appl. No.: 345,161

[22] Filed: Nov. 28, 1994

[30] Foreign Application Priority Data

Nov. 30, 1993 [JP] Japan ................................ 5-326285

[51] Int. Cl.$^6$ ........................................................ C08L 95/00
[52] U.S. Cl. .............................. 524/484; 524/59; 524/62; 524/66; 524/67; 524/485; 524/486
[58] Field of Search .................................. 524/59, 62, 65, 524/66, 67, 481, 482, 483, 484, 485, 486

[56] References Cited

U.S. PATENT DOCUMENTS

| | | | |
|---|---|---|---|
| 4,101,605 | 7/1978 | Gergen et al. | 260/873 |
| 5,104,921 | 4/1992 | Erickson et al. | 524/274 |

FOREIGN PATENT DOCUMENTS

| | | |
|---|---|---|
| 0428405 | 5/1991 | European Pat. Off. . |
| 0428405A2 | 5/1991 | European Pat. Off. . |
| 2225497 | 11/1974 | France . |

*Primary Examiner*—Edward J. Cain
*Attorney, Agent, or Firm*—Panitch Schwarze Jacobs & Nadel, P.C.

[57] ABSTRACT

A thermoplastic elastomer composition is provided which is highly durable and free from oxidative deterioration when exposed to elevated temperature as in molding and also ambient temperature at which an end product thereof is used. These advantageous features are attributable to the use of a hydrogenated oil of the class disclosed which serves effectively to suppress the tendency of an elastomer undergoing gelation or cross-linking particularly when heated in the atmosphere. The hydrogenated oil is derivable from hydrogenation of a liquid product resulting from thermally treating a coal tar or distillates thereof at above 400° C.; a liquid product resulting from thermally treating at above 400° C. a petroleum crude oil, distillates thereof, or a liquid hydrocarbon derived from catalytic cracking, hydrogenative cracking or catalytic reforming of petroleum distillates; or a thermally cracked tar resulting from thermally cracking a petroleum crude oil or distillates thereof.

3 Claims, 5 Drawing Sheets

THERMOPLASTIC ELASTOMER COMPOSITION

BACKGROUND OF THE INVENTION

1. Field of the Invention

This invention relates to a thermoplastic elastomer composition for use in the manufacture of a variety of molded articles.

2. Prior Art

Thermoplastic elastomers are reputed for their unique performance thanks to the combined physical properties of rubber and plastics. However, due to a relatively short history of their research and development, such elastomers still have much to be desired for improvement particularly with respect to deterioration by oxidation. It has been proposed to certain oxidation inhibitors suitable for use with a selected class of rubbers or plastics. Such oxidation inhibitors are however not quite economically feasible and not entirely satisfactory in efficacy particularly in view of an extremely high temperature at which an elastomer can be molded as compared to rubber.

SUMMARY OF THE INVENTION

Therefore, the present invention seeks to provide a thermoplastic elastomer composition which is highly durable and substantially free from oxidative deterioration during its molding at elevated temperature, and also after it is molded into a finished article for use at room temperature. This objective is attained by the use of a selected amount of a hydrogenated oil derived from thermal and hydrogenative treatment of a petroleum tar or petroleum fraction (including petroleum distillation residues).

According to the invention, there is provided a thermoplastic elastomer composition which comprises 100 parts by weight of a thermoplastic elastomer and from 0.1 to 20 parts by weight of a hydrogenated oil derived from hydrogenation of either of:

i) a liquid product resulting from thermally treating a coal tar or distillates thereof at above 400° C.;

ii) a liquid product resulting from thermally treating at above 400° C. a petroleum crude oil, distillates thereof, or a liquid hydrocarbon derived from catalytic cracking, hydrogenative cracking or catalytic reforming of petroleum distillates; or iii) a thermally cracked tar resulting from thermally cracking a petroleum crude oil or distillates thereof.

The invention will be better understood from the following description and with reference to the accompanying drawings.

DETAILED DESCRIPTION OF THE INVENTION

Figure 1:
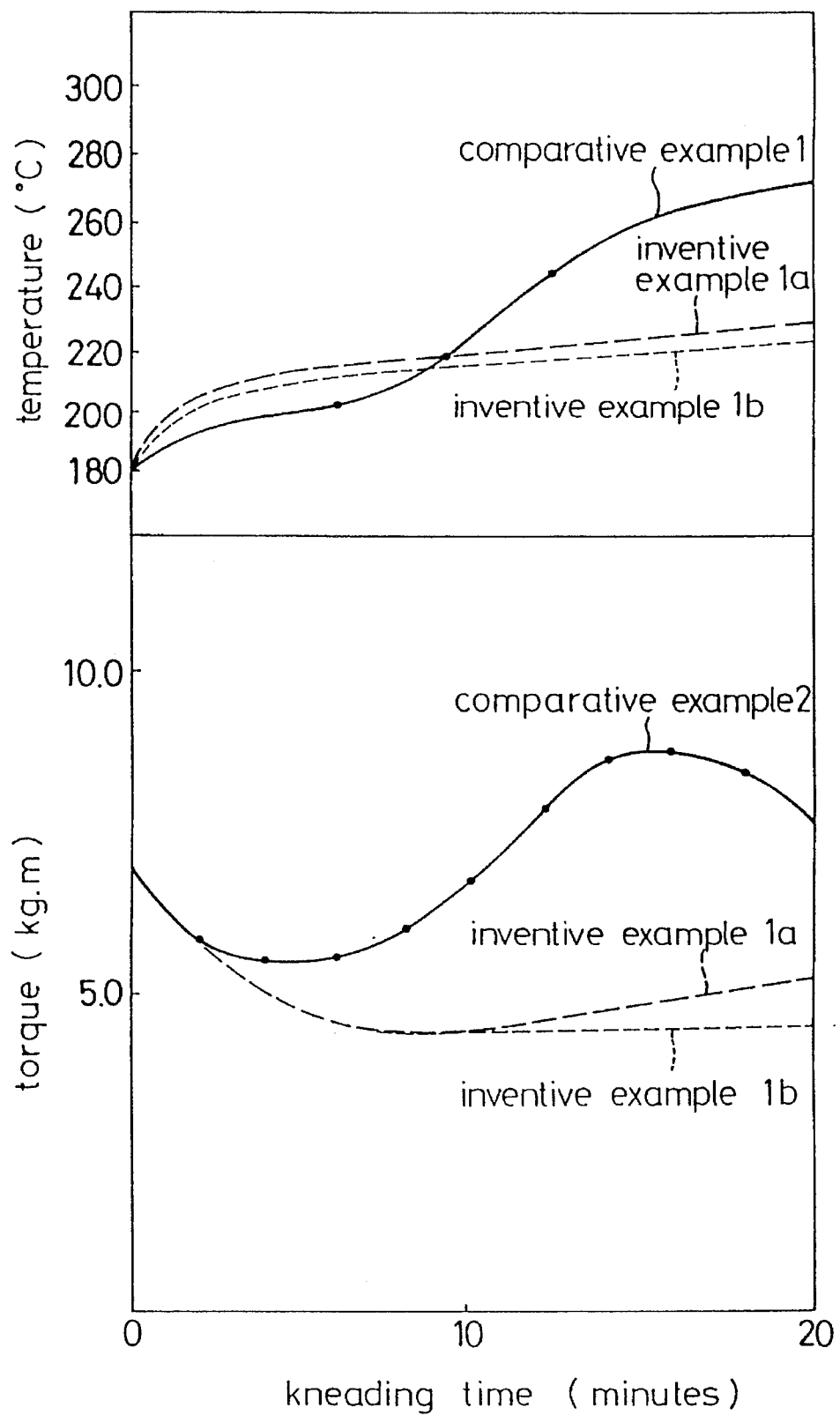
FIG. 1 graphically displays the relationship between kneading time, temperature and torque of the elastomer compositions of Inventive Examples 1a, 1b and Comparative Example 1, respectively.

The term thermoplastic elastomer as used herein includes a styrene-based elastomer having a hard segment of polystyrene and a soft segment consisting of polyisoprene rubber, polybutadiene rubber, hydrogenated isoprene rubber and hydrogenated butadiene rubber; an olefin-based elastomer having a hard segment of polyethylene or polypropylene and a soft segment of ethylene/propylene rubber (EPR or EPDM), acryl rubber, acrylonitrile butadiene rubber, ethylene/vinyl acetate copolymer, polyethylene chloride, natural rubber, epoxized natural rubber, butyl rubber or chloroprene rubber; a vinyl chloride-based elastomer having a hard segment of crystalline polyvinyl chloride and a soft segment of non-crystalline polyvinyl chloride or acrylonitrile butadiene; a urethane-based elastomer having a hard segment of urethane and a soft segment of polyether or polyester; an ester-based elastomer having a hard segment of polyamide and a soft segment of polyether, polyester, chloroprene rubber or acryl rubber; and an amide-based elastomer having a hard segment of polyamide and a soft segment of polyether or polyester. Other thermoplastic elastomers eligible for the purpose of the invention include those having a crystalline polyethylene hard segment and a polyethylene chloride soft segment; those having a metallic carboxylate ion cluster hard segment and a non-crystalline polyethylene soft segment; those having a syndiotactic-1,2-butadiene rubber hard segment and a non-crystalline butadiene rubber soft segment; those having a trans-1,4-isoprene rubber hard segment and an non-crystalline isoprene rubber soft segment; those having a fluoroplastic hard segment and a fluororubber soft segment; those having a crystalline polyethylene hard segment and an ethylene/vinyl acetate copolymer or ethylene/ethyl acrylate copolymer soft segment; and those having a hard segment of nylon and a soft segment of acrylonitrile butadiene rubber, polyethylene chloride, acryl rubber or urethane.

The term hydrogenated oil referred to as an additive to the inventive elastomer composition generally designates those hydrogenated oils of which sources are identified as i), ii) and iii) in the description and the appended claims.

The term coal tar is used herein to generally refer to all distillates from dry distillation of coal and preferably to those boiling in the range of 150°–600° C. Coal tar distillates herein refer generally to all tar fractionates but preferably to those boiling in the range of 200°–500° C. exemplarily including a cleaning oil, anthrathene oil, tar oil, tar gas oil, carvol oil, naphthalene oil, pitch oil, cresole oil, liquefied coal oil and mixtures thereof, of which anthrathene oil and pitch oil are most preferred as hydrogenated oil source i).

The term petroleum distillate referred to in regard to hydrogenated oil sources ii) and iii) designates a range of fractions and residues resulting from atmospheric or vacuum distillation of a crude oil. The catalytic cracking, hydrogenative cracking and catalytic reforming applied hereunder to the petroleum distillates as well as the thermal cracking applied to the crude oil or petroleum distillates are those processes commonly employed at petroleum refineries.

Catalylic cracking is normally effected at a reaction temperature of 400°–600° C. in the presence of a fluid catalyst to lighten a heavy oil. Hydrogenative cracking is carried out for a similar purpose normally at 350°–500° C. in the presence of a catalyst and a high pressure hydrogen. Catalytic reforming is normally conducted at 450°–550° C. and 5–40 kg/cm² in the presence of a reforming catalyst to improve the octane number of gasoline. Thermal cracking is applied to a heavy oil at a reaction temperature of usually 400°–800° C.

The liquid hydrocarbon referred to herein as a hydrogenative oil source has a boiling point of above 200° C., preferably above 250° C. and is suitably rich in aromatics, typical examples of which are catalytically cracked, hydrogenatively cracked and catalytically reformed oil residues.

The thermal treatment to derive hydrogenated oil sources i) and ii) is carried out at a pressure of 0.5–15 kg/cm² and a temperature of above 400° C., preferably 450°–600° C., more preferably 450°–520° C., for a time period of usually 1–60 minutes, preferably 2–30 minutes, though dependent upon the temperature employed. Apparatus for the thermal treatment under contemplation may be of the type of a coil, straight tube or tank, with no particular restriction. Two separate products are obtained from the thermal treatment, one normally gaseous and the other normally liquid, the latter having been removed preferably of its light components boiling below 250° C. as well as of solids if present prior to subsequent hydrogenation treatment.

A thermally cracked tar, another hydrogenated oil source iii), derived from a petroleum crude oil or its distillates, should also be treated to remove its light components boiling below 250° C. prior to hydrogenation.

The hydrogenation treatment of sources i), ii) and iii) according to the invention is effected in the presence of certain known hydrogenation catalysts and high pressure hydrogen under such reaction conditions which are dependent upon the type of catalyst used. Reaction conditions would be a temperature in the range of 300°–400° C. and a hydrogen pressure in the range of 30–150 atmospheric in the case where there was used a desulfurization or denitration catalyst comprising an oxide or sulfide of metals of Groups V–VIII of the Periodic Table particularly including nickel, cobalt, molybdenum, vanadium and tungsten supported on an inorganic carrier such as of alumina, silica-alumina and cation-substituted zeolite. If there was used a hydrogenation catalyst which comprises a catalyst component selected from the group of nickel, nickel oxide, nickel-copper, platinum, platinum-rhodium, platinum-lithium, rhodium, palladium, cobalt, Raney cobalt and ruthenium supported on an inorganic carrier such as of active carbon, alumina, silica-alumina, diatomaceous earth and zeolite, the hydrogenation treatment according to the invention would be suitably effected at a temperature of 150°–350° C. and a hydrogen pressure of 30–150 atmospheric.

For the hydrogenation treatment, there may be used a fixed bed, a moving bed or fluid bed type reactor well known in the art. The reaction product from the reactor may be used per se as a hydrogenated oil for the purpose of the invention but should preferably be treated to remove components boiling below 200° C. prior to blending with a thermoplastic elastomer.

The present invention further contemplates the provision of a thermoplastic elastomer composition which incorporates, in addition to the aforesaid hydrogenated oils, at least one of the following oxidation inhibitors in an amount of 0.01–20, preferably 0.5–10 parts by weight per 100 weight parts elastomer.

Preferred examples of the oxidation inhibitors to be added are as follows:

Phenol-based Inhibitor

Triethyleneglycol-bis[3-(3-t-butyl-5-methyl-4-hydroxyphenyl)propionate], n-octadecyl-3-(3'-5'-di-t-butyl-4'-hydroxyphenyl)propionate, tetrakis-[methylene-3-(3'-5'-di-t-butyl-4'-hydroxyphenyl)propionate]methane, 1,3,5-trimethyl-2,4,6-tris-(3,5-di-t-butyl-4-hydroxybenzyl)-benzene, tris(3,5-di-t-butyl-4-hydroxybenzl)isocyanurate, N,N'-hexamethylenebis(3,5-di-t-butyl-4-hydroxy-hydrocinnamide) and di-t-butylparacresol.

Amine-based Inhibitor

Octylated diphenylamine, 2,4-bis-(n-octylthio)-6-(4-hydroxy-3,5-di-t-butylanilino)-1,3,5-triazine, phenyl-1-naphthylamie, poly(2,2,4-trimethyl-1,2-dihydroquinoline and N,N'-diphenyl-p-phenylenediamine.

Sulfur-based Inhibitor

Dilaurylthiodipropionate, distearylthiodipropionate and pentaerythritol-tetrakis-(β-lauryl-thiopropionate).

Phosphorus-based Inhibitor

Tris(2,4-di-t-butylphenylphosphite), tetrakis(2,4-di-t-butylphenyl)-4,4'-biphenylenephosphonate, di(2,4-di-t-butylphenyl)pentaerythritoldiphosphite, trisnonylphenylphosphite, diphenylisooctylphosphite and tetratridecyl-4,4'-butylidenebis-(3-methyl-6-t-butylphenyl)-diphosphite.

If desired and to an appropriate extent, there may be also added photostabilizers such as of benzotriazole, benzophenone, salicylate, nickel complex and hindered amine, heavy metal deactivaters, metallic soaps, plasticizers, organotin compounds, flame-retarders, antistatic agents, lubricants, antiblocking agents, fillers, blowing agents, cross-linking agents and the like.

The invention will be further described by way of the following examples.

Inventive Examples 1a, 1b and Comparative Example 1

There were prepared three different elastomer compositions shown in Table 1 which were kneaded at an initial temperature of 180° C.

TABLE 1

| Components | Elastomer Composition (weight parts) | | |
|---|---|---|---|
| | Comparative Example 1 | Inventive Example 1a | Inventive Example 1b |
| SBS | 100 | 100 | 100 |
| Naphthene-based oil | 10 | 10 | 10 |
| Cumarone resin | 5 | 5 | 5 |
| Additive B1 | — | 2 | 5 |

The starting elastomer SBS was one commercially available under the tradename "Carifrex TR 1101" of Shell Japan Ltd. The additive B1 was a hydrogenated oil derived from thermally treating a catalytically cracked petroleum distillate at 460° C. for 30 , with the resulting liquid product treated to remove light components boiling below 250° C. and thereafter subjected to hydrogenation in the presence of a commercially available catalyst (Co-Mo/Al$_2$O$_3$) at a temperature of 380° C. at a hydrogen pressure of 135 atmospheric and at a liquid hourly space velocity (LHSV) of 0.35 hr$^{-1}$. The thus obtained hydrogenated oil was further treated to strip off light fractions boiling below 250° C. and then used as additive B1. As appears clear from the graph of FIG. 1, the composition of Comparative Example 1 devoid of additive B1 exhibited a sharp rise in torque with a temperature increase up to 260° C. soon after the initiation of kneading. Whereas, the inventive compositions 1a and 1b containing additive B1 showed no appreciable torque rise with less temperature increases. Table 2 below shows the relationship between kneading time and gel proportions. By gel proportions is meant tetrahydrofuran (THF) insolubles (at 40° C.) contained in the respective compositions.

TABLE 2

|  | Kneading Time (minutes) | Gel Proportions (wt. %) |
|---|---|---|
| Comparative Example 1 | 10 | 16 |
|  | 20 | 83 |
| Inventive Example 1a | 10 | 15 |
|  | 20 | 22 |
| Inventive Example 1b | 10 | 16 |
|  | 20 | 19 |

With kneading time of 10 minutes, all of the three compositions were nearly comparable in gel proportions. However, as kneading continued for 20 minutes, the composition of Comparative Example 1 exhibited significant increases in gel proportions, whilst those of Inventive Examples 1a and 1b underwent only a small change thanks to the presence of additive B1 which served effectively to suppress the gelation.

The three composition samples were tested for hardness Hs (JISA), tensile strength ($T_B$), breaking extension ($E_B$) and modulus $M_{300}$ at 300% elongation with the results shown in Table 3 below.

TABLE 3

| Physical Properties | Comparative Example 1 | Inventive Example 1a | Inventive Example 1b |
|---|---|---|---|
| Kneading time (10 minutes) |  |  |  |
| Hs (JIS A) | 69 | 73 | 71 |
| $T_B$ (MPa) | 6.1 | 22.1 | 18.7 |
| $E_B$ (%) | 640 | 940 | 870 |
| $M_{300}$ (MPa) | 2.6 | 2.4 | 2.1 |
| Kneading time (20 minutes) |  |  |  |
| Hs (JIS A) | 76 | 73 | 75 |
| $T_B$ (MPa) | 1.8 | 3.2 | 15.6 |
| $E_B$ (%) | 30 | 410 | 840 |
| $M_{300}$ (MPa) | — | 2.4 | 2.3 |

Here too, the compositions of Inventive Examples 1a and 1b (containing 5 parts by weight of additive B1) far excelled the composition of Comparative Example 1 (devoid of additive B1) in the various physical/mechanical properties.

Figure 2:
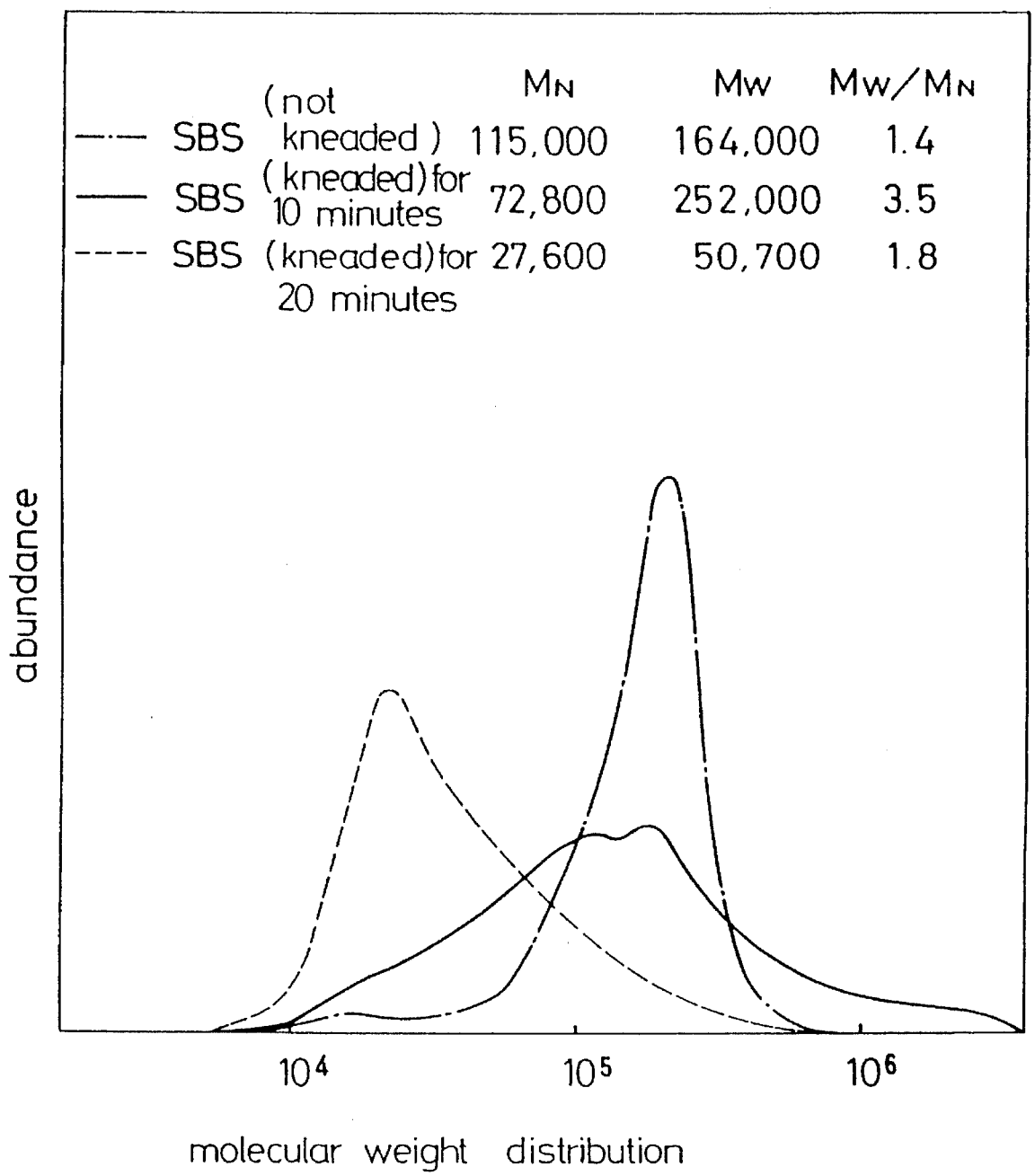
FIG. 2 is a graphical display of the molecular weight distribution of an elastomer composition of Comparative Example 1.
Figure 3:
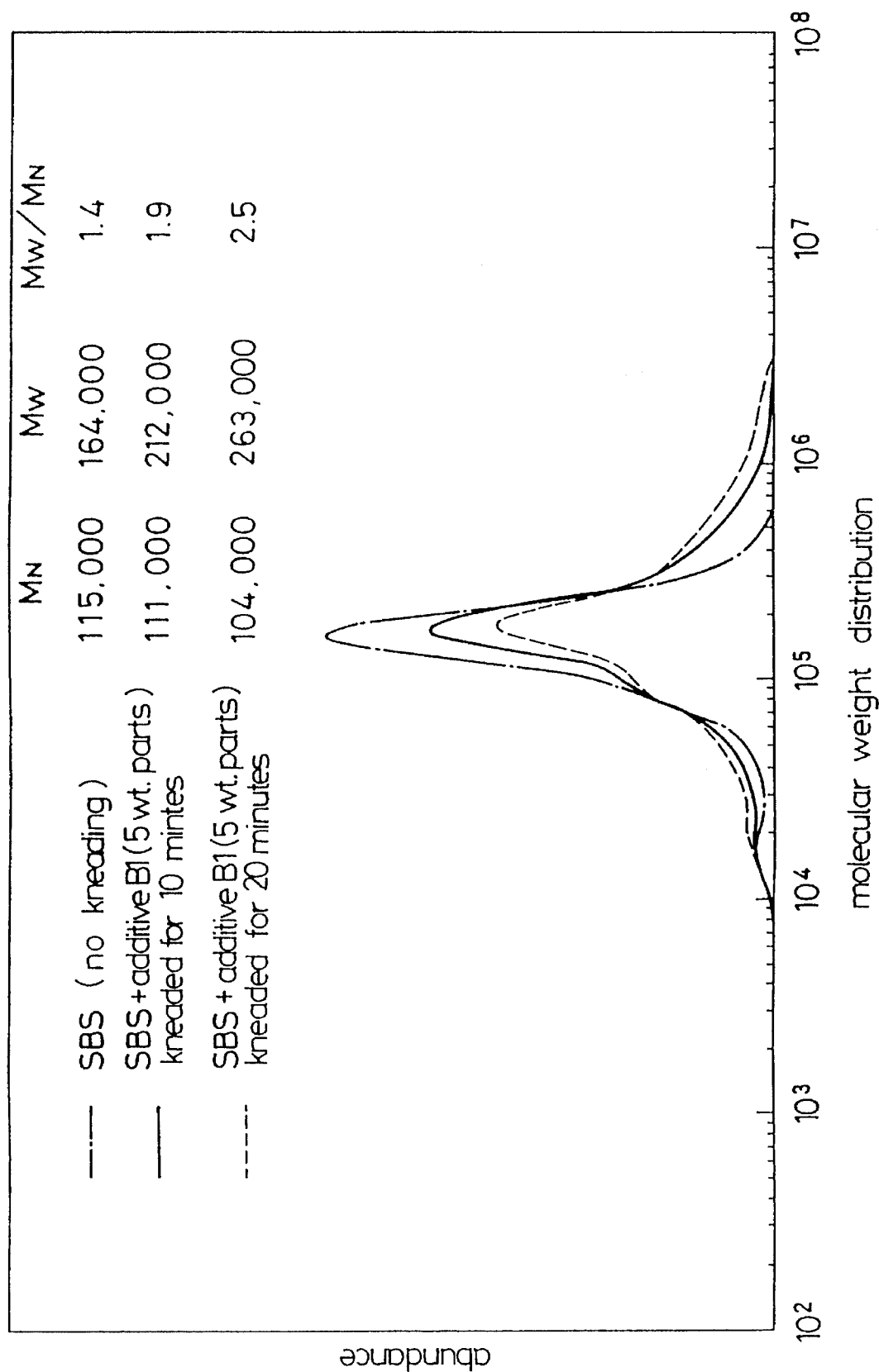
FIG. 3 is a graphical display of the molecular weight distribution of two inventive elastomer compositions.

Gel permeation chromatography was used to determine THF solubles with the results shown by way of molecular weight distribution in FIGS. 2 and 3 representing the compositions of Comparative Example 1 and Inventive Example 1b, respectively.

From FIG. 2 it will be seen that the composition of Comparative Example 1 is considerably variable in molecular weight distribution, greatly deviating over 20 minutes of kneading from SBS elastomer. In contrast to this, the composition of Inventive Example 1b is closely comparable in molecular weight distribution to SBS elastomer as shown in FIG. 3.

Inventive Example 2 and Comparative Example 2

There were prepared two elastomer compositions identified in Table 4 where were kneaded at an initial temperature of 180° C.

The styrene-isoprene-styrene (SIS) was a thermoplastic elastomer tradenamed SIS 5,000 of Nippon Synthetic Rubber Co. The additive B2 was a hydrogenated oil derived from thermally cracking a Middle-East origin petroleum atmospheric distillate at 480° C. for 20 minutes, with the resulting tar product treated to remove light fractions (boiling below 250° C.) by distillation and thereafter subjected to hydrogenation in the presence of a commercially available catalyst (Ni-Co-Mo/$Al_2O_3$) at a temperature of 400° C. at a hydrogen pressure of 135 atmospheric and at a LHSV of 0.5 $hr^{-1}$. The resulting hydrogenated oil was further treated to remove light fractions boiling below 250° C. and then employed as additive B2.

TABLE 4

| Components | Elastomer Composition (weight parts) | |
|---|---|---|
|  | Comparative Example 9 | Inventive Example 2 |
| SIS | 100 | 100 |
| Naphthene-based oil | 10 | 10 |
| Cumarone resin | 5 | 5 |
| Additive B2 | — | 5 |

Figure 4:
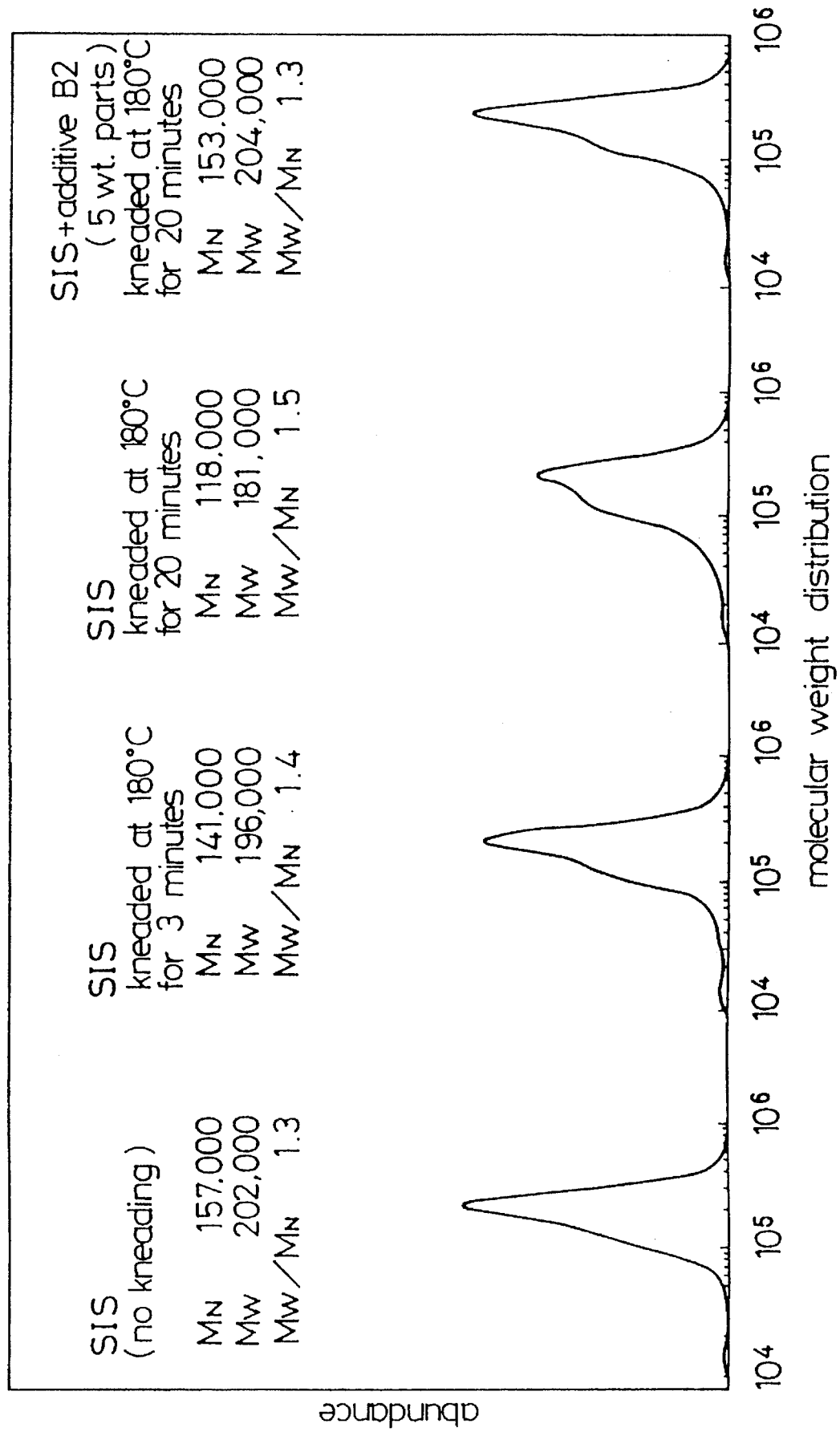
FIG. 4 is a graphical display of the molecular weight distribution of the elastomer compositions of Inventive Example 2 and Comparative Example 2, respectively.

With SIS used as the thermoplastic elastomer material, either of the two compositions, particularly that of Comparative Example 2 devoid of additive B2 underwent no appreciable gelation and did not show any substantial rise in torque during kneading. The two respective elastomer compositions were tested for physical/mechanical properties and molecular weight distribution in a manner similar to the previous examples, with the results shown in Table 5 and FIG. 4.

TABLE 5

| Physical Properties | Comparative Example 2 | Inventive Example 2 |
|---|---|---|
| Kneading time (minutes) | 3 | 20 | 20 |
| Hs (JIS A) | 28 | 25 | 30 |
| $T_B$ (MPa) | 10.1 | 5.2 | 13.3 |
| $E_B$ (%) | >1400 | >1400 | >1400 |
| $M_{100}$ (MPa) | 0.4 | 0.4 | 0.5 |
| $M_{300}$ (MPa) | 0.6 | 0.5 | 0.7 |
| $M_{500}$ (MPa) | 0.8 | 0.6 | 0.9 |

It will be seen that the composition of Comparative Example 2 without additive B2 exhibited a rapid change in physical properties after a lapse of only 3 minutes in kneading and grew into a state no longer likened to rubber, whereas the composition of Inventive Example 2 containing additive B2 stayed substantially unchanged even after 20 minutes of kneading. The composition of Comparative Example 2 also exhibited variations in molecular weight distribution with increasing kneading time, whereas the composition of Inventive Example 2 showed a molecular weight distribution substantially comparable to SIS as appears clear from FIG. 4.

Inventive Example 3

The elastomer composition in this example was similar to that in Inventive Example 1 except for the use of an additive B3.

TABLE 6

| Components | Elastomer Composition (weight parts) | |
| --- | --- | --- |
| | Comparative Example 1 | Inventive Example 3 |
| SBS | 100 | 100 |
| Naphthene-based oil | 10 | 10 |
| Cumarone resin | 5 | 5 |
| Additive B3 | — | 2 |

The additive B3 was a hydrogenated oil derived from thermally treating decrystallized ancerathane oil at 435° C. for 20 minutes with the resulting liquid product treated to remove light fractions boiling below 250° C. and thereafter subjected to hydrogenation in the presence of a commercially available catalyst (nickel/diatomaceous earth) at a temperature of 310° C. at a hydrogen pressure of 120 atmospheric and at a liquid hourly space velocity (LHSV) of 0.22 hr$^{-1}$. The thus obtained hydrogenated oil was further treated to strip off light fractions boiling below 200° C. and then used as additive B3.

Figure 5:
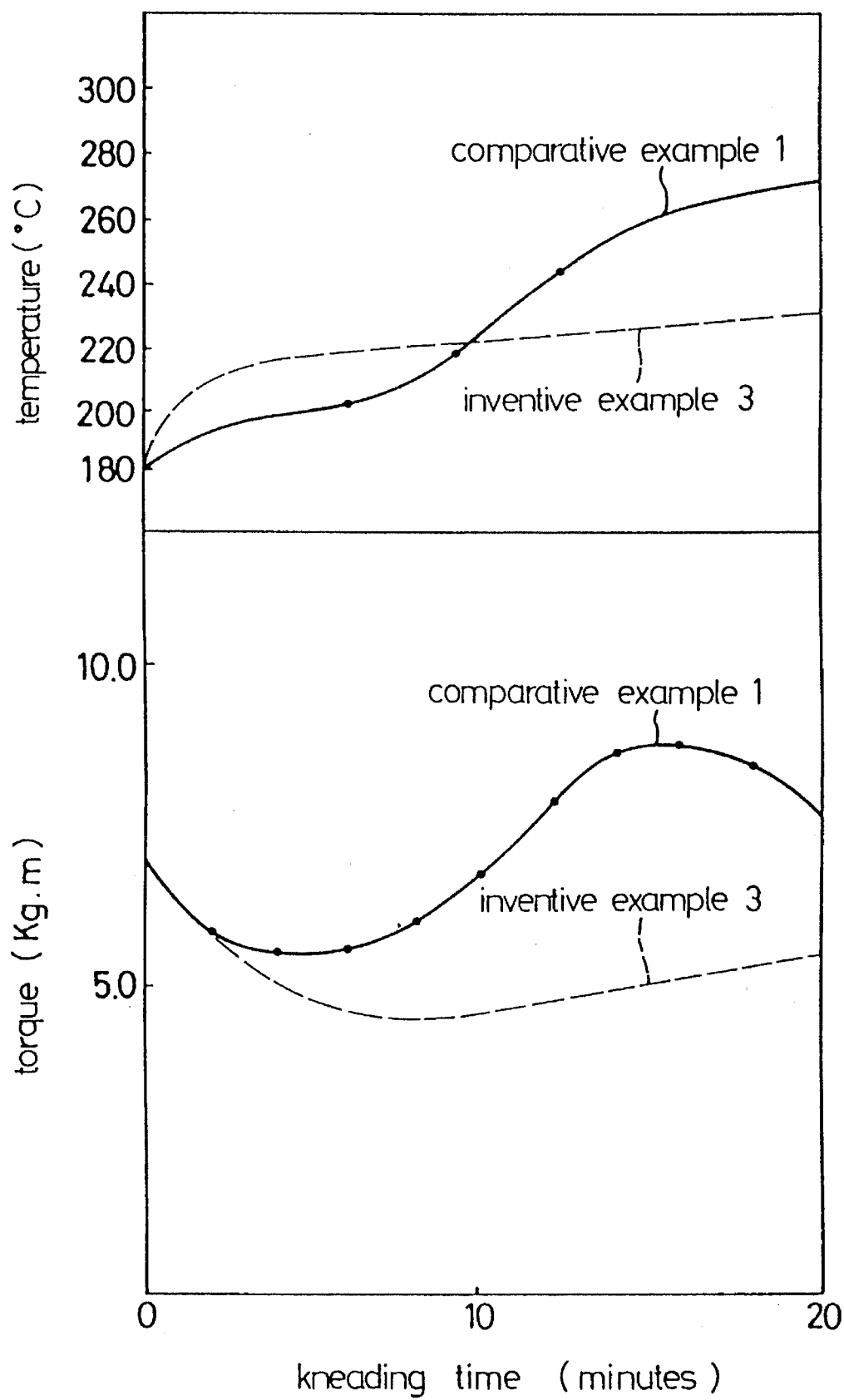
FIG. 5 graphically displays the relationship between kneading time, temperature and torque of the elastomer composition of Inventive Example 3 compared to that of Comparative Example 1.

The composition of Inventive Example 3 was compared with that of Comparative Example 1 as shown in FIG. 5 depicting changes in torque and temperature, from which it will be seen that the use of additive B3 effectively suppressed the rise in both torque and temperature of the inventive composition. A comparison was further made in respect of gelation as shown in Table 7 below.

TABLE 7

| | Kneading Time (minutes) | Gel Proportions (wt. %) |
| --- | --- | --- |
| Comparative Example 1 | 10 | 16 |
| | 20 | 83 |
| Inventive Example 3 | 10 | 16 |
| | 20 | 23 |

Inventive Example 4 and Comparative Example 4

Additive B4 was prepared by thermally cracking Middle-East origin petroleum oil at 450° C. for 50 minutes, the resulting liquid product being treated to remove light fractions (boiling below 250° C.) and solids and thereafter subjected to hydrogenation in the presence of a commercially available catalyst (Co-Mo/Al$_2$O$_3$) at a temperature of 382° C. under a hydrogen pressure of 140 atmospheric and at a LHSV of 0.30 hr$^{-1}$. The resulting hydrogenated product was further treated to remove light fractions (boiling below 250° C.). A polymer was prepared by admixing ethylene-propylene rubber (EPM) and dicumyl peroxide (DCP) in an amount of 40:0.3 by weight ratio, the admixture being mixed at 180° C. in the atmosphere for 1 minute. Polypropylene (PP) and additive B4 were added in an amount of 60 and 2 (weight ratio) respectively per 40 EPM, followed by stirring for 2 minutes. The resulting polymer was cut into a sheet 1 mm thick, which was compared with the counterpart of Comparative Example 4 devoid of additive B4 with the results shown in Table 8 below.

TABLE 8

| Physical Properties | Inventive Example 4 | Comparative Example 4 |
| --- | --- | --- |
| Hardness (Durometer D) | 45 | 37 |
| T$_B$ (MPa) | 9.7 | 5.1 |
| E$_B$ (%) | 101 | 22 |
| M$_{100}$ (MPa) | 6.1 | 3.0 |

Inventive Example 5 and Comparative Example 5

An additive B5 was a hydrogenated oil derived from thermally treating a catalytically reformed petroleum distillate (boiling above 200° C.) at 445° C. for 15 minutes, with the resulting liquid product treated to remove light fractions boiling below 200° C. and thereafter subjected to hydrogenation in the presence of a commercially available catalyst (Co-Mo/Al$_2$O$_3$) at a temperature of 378° C. at a hydrogen pressure of 155 atmospheric and at a liquid hourly space velocity (LHSV) of 0.23 hr$^{-1}$. The thus obtained hydrogenated oil was further treated to strip off light fractions boiling below 250° C. and then used as additive B5.

2 parts by weight of this additive B5 and 0.2 part by weight of di-t-butylparacresol were added to 100 parts by weight of polyethylene chloride (CPE) and mixed together for 3 minutes. The resulting polymer or elastomer composition was cut into a 1 mm thick sheet whose mechanical strength was compared with the counterpart polymer of Comparative Example 5 devoid of additive B5 with the results shown in Table 9 below.

TABLE 9

| Mechanical Properties | Inventive Example 5 | Comparative Example 5 |
| --- | --- | --- |
| Hs (JIS A) | 52 | 83 |
| T$_B$ (MPa) | 12.2 | 6.3 |
| E$_B$ (%) | 610 | 120 |
| M$_{100}$ (MPa) | 7.0 | 10.8 |

What is claimed is:

1. A thermoplastic elastomer composition which comprises 100 parts by weight of a thermoplastic elastomer and from 0.1 to 20 parts by weight of a hydrogenated oil derived from hydrogenation of either of:

i) a liquid product resulting from thermally treating a coal tar or distillates thereof;

ii) a liquid product resulting from thermally treating a petroleum crude oil, distillates thereof, or a liquid hydrocarbon derived from catalytic cracking, hydrogenative cracking or catalytic reforming of petroleum distillates; or iii) a thermally cracked tar resulting from thermally cracking a petroleum crude oil or distillates thereof, the thermal treatment for said products of i) and being carried out at a temperature above 400° C. and at a pressure of 0.5 to 1.5 kg/g$^2$.

2. A thermoplastic elastomer composition according to claim 1 wherein said hydrogenation is effected in the presence of a hydrogenation catalyst at a temperature of 150°–350° C. and a hydrogen pressure of 30–150 atmospheric.

3. A thermoplastic elastomer composition according to claim 1 wherein said composition further comprises 0.01–20 parts by weight of an oxidation inhibitor selected from the group consisting of phenol-based, amine-based, sulfur-based and phosphorus-based oxidation inhibitors.

* * * * *